US012564965B2

(12) United States Patent
Felip Leon et al.

(10) Patent No.: US 12,564,965 B2
(45) Date of Patent: Mar. 3, 2026

(54) CAMERA AND END-EFFECTOR PLANNING FOR VISUAL SERVOING

(71) Applicant: Intel Corporation, Santa Clara, CA (US)

(72) Inventors: Javier Felip Leon, Hillsboro, OR (US); Leobardo Campos Macias, Guadalajara (MX); David Gomez Gutierrez, Tlaquepaque (MX); Javier Turek, Beaverton, OR (US); David Gonzalez Aguirre, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 236 days.

(21) Appl. No.: 18/127,620

(22) Filed: Mar. 28, 2023

(65) Prior Publication Data

US 2024/0326254 A1      Oct. 3, 2024

(51) Int. Cl.
| | |
|---|---|
| *B25J 9/16* | (2006.01) |
| *G06V 10/26* | (2022.01) |
| *H04N 23/695* | (2023.01) |

(52) U.S. Cl.
CPC ........... B25J 9/1697 (2013.01); B25J 9/1664 (2013.01); G06V 10/26 (2022.01); H04N 23/695 (2023.01)

(58) Field of Classification Search
CPC ...... B25J 9/1697; B25J 9/1664; B25J 9/1666; B25J 9/1676; G06V 10/26; H04N 23/695; G05B 2219/39039; G05B 2219/39082; G05B 2219/39391; G05B 2219/39566; G05B 2219/40476; G05B 2219/40604
See application file for complete search history.

(56) References Cited

U.S. PATENT DOCUMENTS

| | | | | |
|---|---|---|---|---|
| 12,318,951 | B2 * | 6/2025 | Abouelela | G06V 10/443 |
| 2016/0243704 | A1 * | 8/2016 | Vakanski | B25J 9/1664 |
| 2019/0009412 | A1 * | 1/2019 | Khan | B25J 9/1697 |
| 2019/0291277 | A1 * | 9/2019 | Oleynik | B25J 9/1669 |
| 2021/0401520 | A1 * | 12/2021 | Huang | A61B 34/37 |
| 2022/0168899 | A1 * | 6/2022 | Boroushaki | G06K 19/0723 |
| 2023/0342967 | A1 * | 10/2023 | Lam | G06T 7/70 |

OTHER PUBLICATIONS

"European Application Serial No. 23217503.4, Extended European Search Report mailed Jun. 17, 2024", 11 pgs.

* cited by examiner

Primary Examiner — Nhi Q Bui
(74) Attorney, Agent, or Firm — Schwegman Lundberg & Woessner, P.A.

(57) ABSTRACT

Various aspects of techniques, systems, and use cases may be used for camera and end-effector planning for visual servoing for example in redundant manipulators. A technique may include generating a set of paths of an end effector of a robotic arm, and ranking the set of paths using an objective function that results in an improvement to a distance between the end effector and a target while maintaining a collision mitigation path for the end effector and minimizing occlusion of a camera affixed to a joint of the robotic arm. The technique may include converting a path of the set of paths into a trajectory based on the ranking, and outputting the trajectory for controlling the robotic arm to move the end effector.

19 Claims, 11 Drawing Sheets

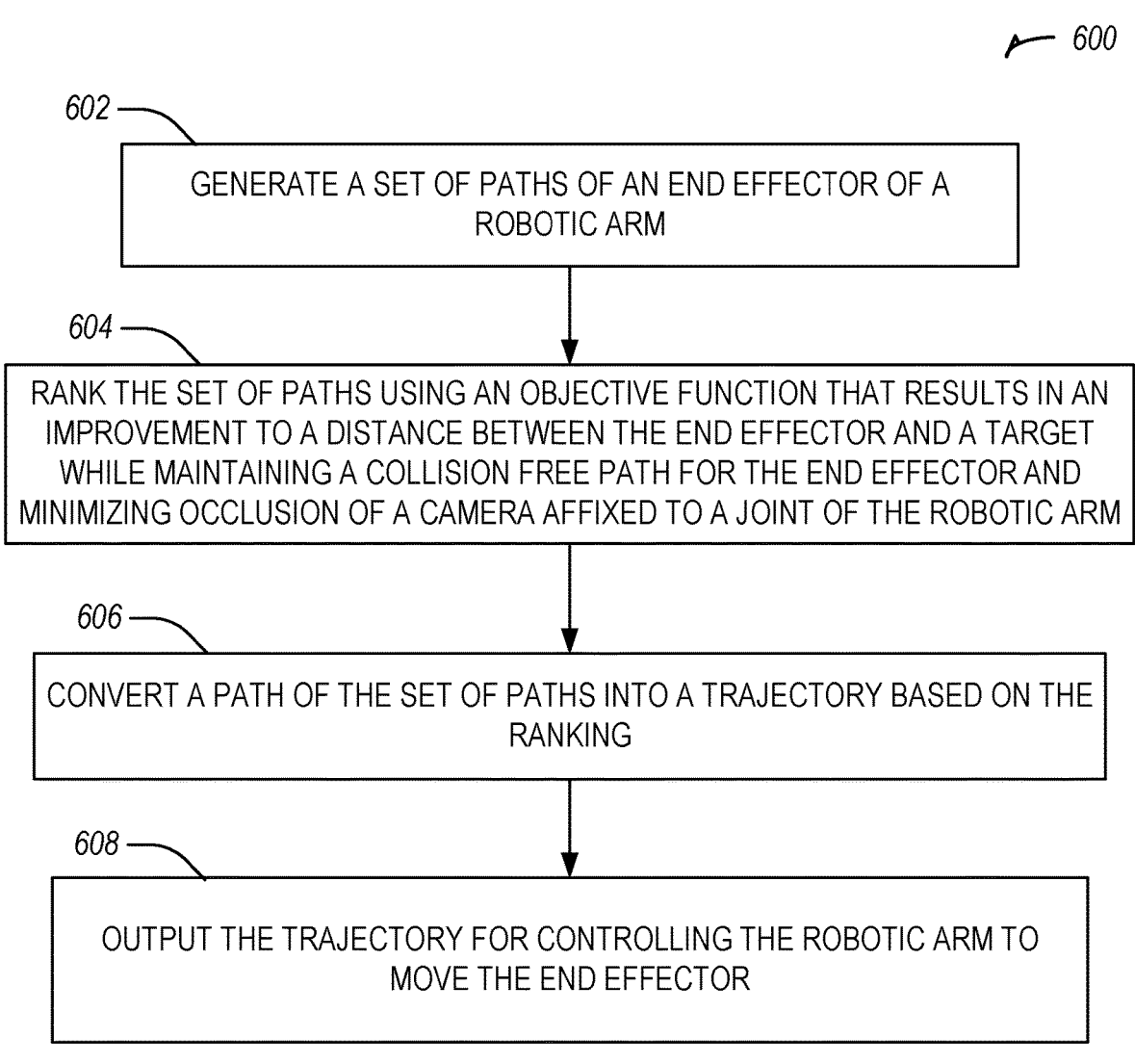

*600*

602 —
GENERATE A SET OF PATHS OF AN END EFFECTOR OF A
ROBOTIC ARM

604 —
RANK THE SET OF PATHS USING AN OBJECTIVE FUNCTION THAT RESULTS IN AN
IMPROVEMENT TO A DISTANCE BETWEEN THE END EFFECTOR AND A TARGET
WHILE MAINTAINING A COLLISION FREE PATH FOR THE END EFFECTOR AND
MINIMIZING OCCLUSION OF A CAMERA AFFIXED TO A JOINT OF THE ROBOTIC ARM

606 —
CONVERT A PATH OF THE SET OF PATHS INTO A TRAJECTORY BASED ON THE
RANKING

608 —
OUTPUT THE TRAJECTORY FOR CONTROLLING THE ROBOTIC ARM TO
MOVE THE END EFFECTOR

RECEIVE A FIRST IMAGE FROM AN END EFFECTOR CAMERA AFFIXED TO A ROBOTIC ARM

704

IDENTIFY AN OCCLUSION IN THE FIRST IMAGE

706

RECEIVE A SECOND IMAGE FROM A JOINT CAMERA AFFIXED TO A JOINT OF THE ROBOTIC ARM

708

PROJECT THE SECOND IMAGE INTO A PERSPECTIVE CORRESPONDING TO THE END EFFECTOR CAMERA

710

OUTPUT A CONTROL SIGNAL TO CONTROL THE ROBOTIC ARM BASED ON A MOVEMENT ALGORITHM USING THE PROJECTED SECOND IMAGE

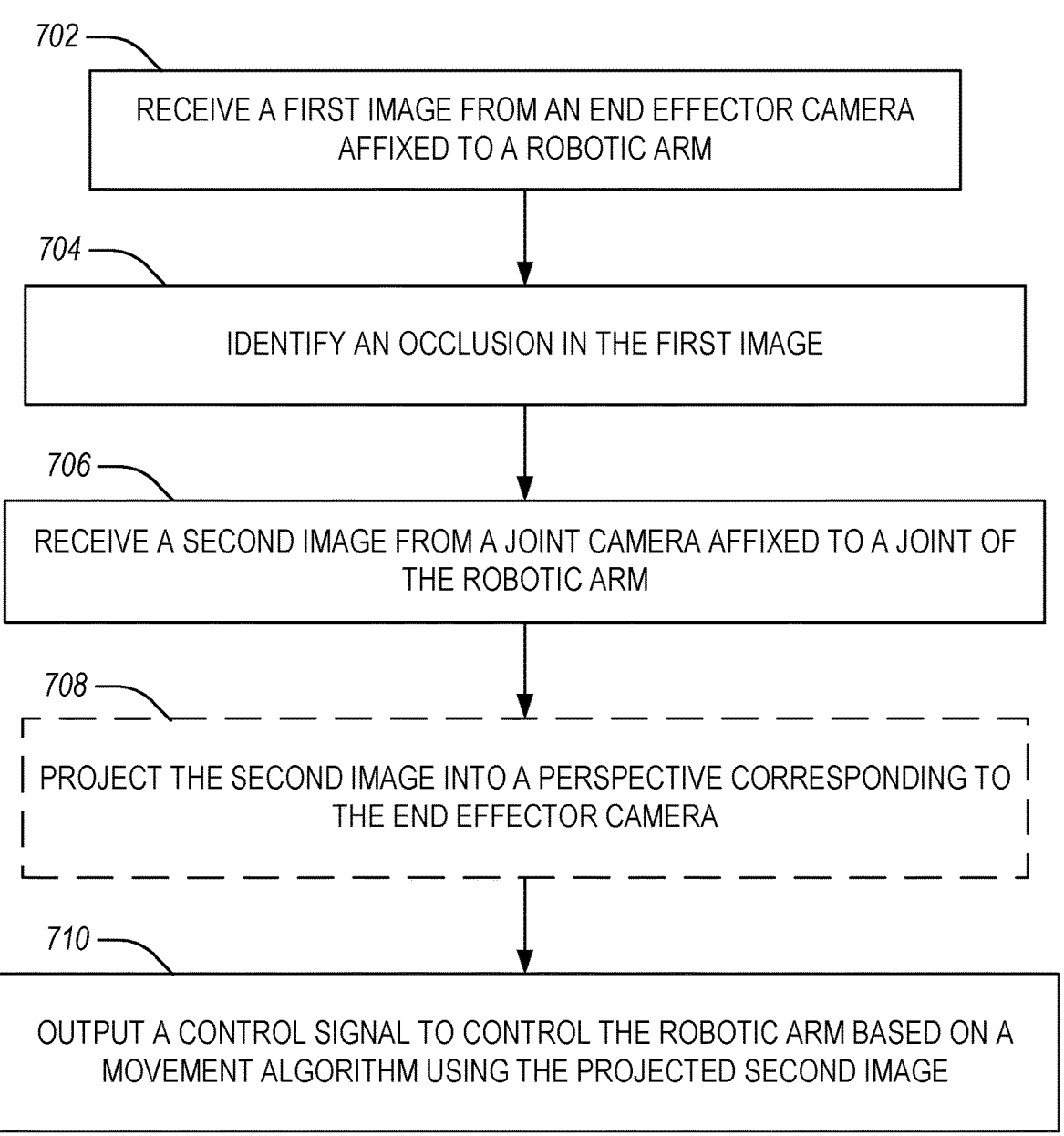

RECEIVE A TRAJECTORY FOR AN END EFFECTOR AFFIXED TO A ROBOTIC ARM

804

IDENTIFY A NEXT POSITION FOR THE END EFFECTOR FROM THE TRAJECTORY

806

GENERATE A SET OF PATHS OF THE END EFFECTOR USING AN IMAGE CAPTURED BY A CAMERA ON A JOINT OF THE ROBOT

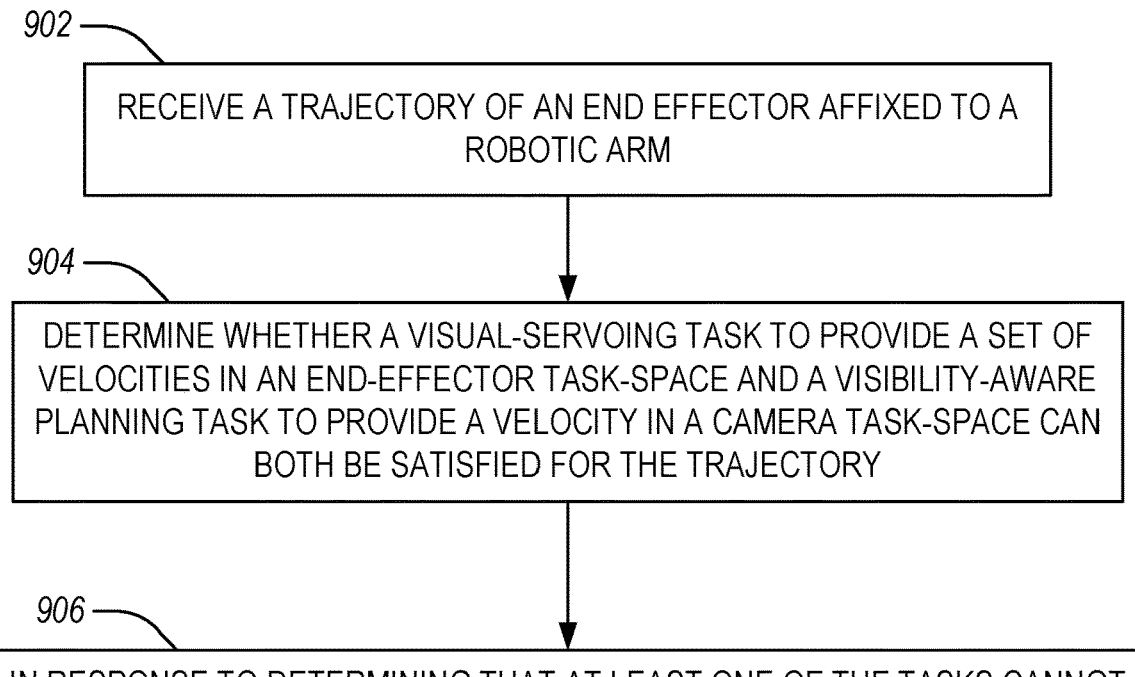

902

RECEIVE A TRAJECTORY OF AN END EFFECTOR AFFIXED TO A
ROBOTIC ARM

904

DETERMINE WHETHER A VISUAL-SERVOING TASK TO PROVIDE A SET OF
VELOCITIES IN AN END-EFFECTOR TASK-SPACE AND A VISIBILITY-AWARE
PLANNING TASK TO PROVIDE A VELOCITY IN A CAMERA TASK-SPACE CAN
BOTH BE SATISFIED FOR THE TRAJECTORY

906

IN RESPONSE TO DETERMINING THAT AT LEAST ONE OF THE TASKS CANNOT
BE SATISFIED, GENERATE A SET OF PATHS OF THE END EFFECTOR FOR THE
TRAJECTORY ACCORDING TO AN OPTIMIZATION THAT SATISFIES THE VISUAL-
SERVOING TASK WHILE MINIMIZING A DEVIATION FROM THE VELOCITY IN THE
CAMERA TASK-SPACE

*FIG. 9*

CAMERA AND END-EFFECTOR PLANNING FOR VISUAL SERVOING

BACKGROUND

Robots and other autonomous agents may be programmed to complete complex real-world tasks. Robotics use artificial intelligence (AI) to perform tasks in industrial environments. Robotics span a wide range of industrial applications, such as smart manufacturing assembly lines, multi-robot automotive component assembly, computer and consumer electronics fabrication, smart retail and warehouse logistics, robotic datacenters, etc. Often robots interact with humans to complete tasks.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 6 illustrates a flowchart showing a technique for camera and end-effector planning according to an example.

FIG. 7 illustrates a flowchart showing a technique for controlling a robotic arm using a joint camera image according to an example.

FIG. 9 illustrates a flowchart showing a technique for optimizing a path of an end effector of a robotic arm for camera visibility to a target according to an example.

DETAILED DESCRIPTION

Figure 1:
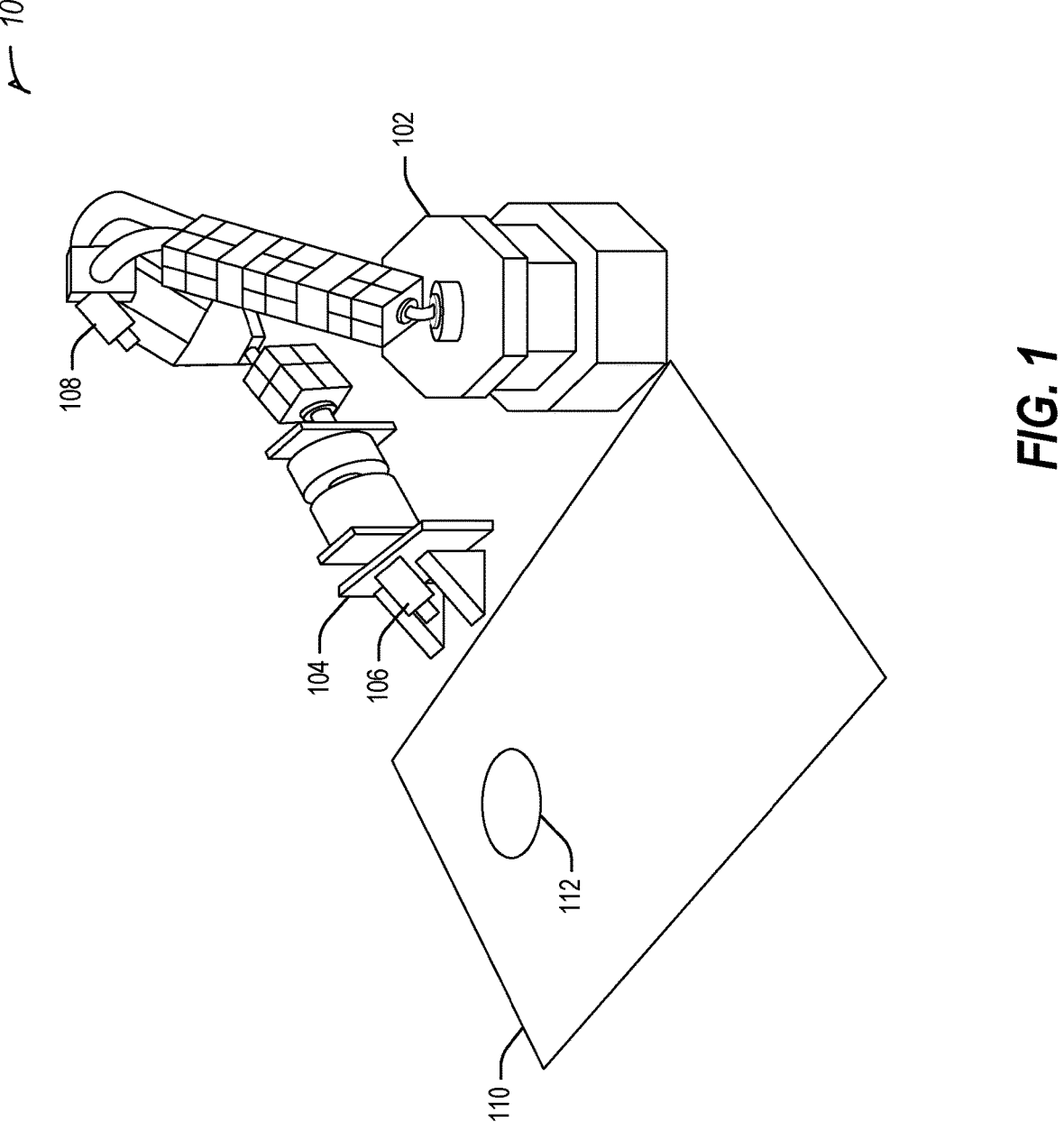
FIG. 1 illustrates a system for camera and end-effector planning according to an example.

Systems and techniques described herein provide camera and end effector planning for visual servoing in a redundant manipulator (e.g., robotic arm). A redundant manipulator or robotic arm may have the capability to move an end effector along a trajectory with two or more different paths in the joint space. These systems and techniques may be used to perform visual servoing under particular conditions including accounting for environmental obstacles and self-occlusion constraints by relying on multiple cameras positioned in the extra degrees of freedom of redundant manipulators. The systems and techniques described herein use one or more cameras on a link or joint of a robot kinematic chain (e.g., of a robotic arm). This improves planning for movement of the robot to continuously keep a target in a field of view of at least one camera (or more in some conditions or where needed). An object or area of interest may be targeted during a task execution, for example to keep the object or the area of interest in view of at least one camera.

Robots may perform high-mix low-volume tasks (HMLV) that change frequently (high-mix) operating for a limited number of times (low-volume) before adjustments or reconfigurations are needed. However, these tasks are still very time consuming and create bottlenecks in manufacturing processes. Flexible automation described herein may be used to remove the challenges that HMLV tasks represent. Flexible automation relies on computer vision algorithms which enable robots to react to variability, especially in environments that are not fully controlled. These algorithms may detect objects or locations of interest and use them to guide the robot. In open-loop control, a target position is detected, and the robot is commanded to move without any feedback. This approach assumes static behavior of objects and accurate 6D pose estimation. When high precision is required, open-loop computer vision may fail due to sensor noise, camera calibration errors, lighting, dust, etc. In such cases, a continuous feedback loop from visual input is required to adapt the robot motion to the changes and react to perception errors. These visual-based closed-loop control algorithms are known as visual servoing. Most visual servoing systems use in-hand cameras. Unfortunately, when the hand gets close to the target, it is quite common that the target becomes occluded or leaves the field of view. In such cases, a control algorithm may not be able to keep track and control the robot properly. The systems and techniques discussed herein may be used to control self-occlusions, occlusions from transported objects, or occlusions from obstacles. The systems and techniques described herein use one or more additional cameras on one or more intermediate links of the robot and use a manipulator redundancy to provide images that may track a target during motion. These systems and techniques may be used to provide a path planning algorithm, dynamic control of a robot, or redundant kinematics.

FIG. 1 illustrates a system 100 for camera and end-effector planning according to an example. The system 100 includes a robotic arm 102, including an end effector 104, and at least two cameras such as camera 106 affixed to a portion of the end effector 104 and camera 108 affixed to a joint, linkage, segment, or other portion of the robotic arm 102 other than the end effector 104. The end effector 104 may interact with a surface 110 or objects on the surface 110, which may include an object 112 of interest.

The one or more of the cameras 106 or 108 may be used to guide the end effector 104 to interact with the object 112. The camera 106 on the end effector 104 may be used as a primary camera to provide visual information to guide a controller of the robotic arm 102 to place the end effector 104 in a particular position, along a particular trajectory or path, etc. The camera 108 may be used as a backup camera, such as when a field of view of the camera 106 is occluded, when the camera 106 loses sight of a particular object such as the object 112, or a portion of the surface 110.

Visual servoing is a closed-loop control technique. The multiple cameras of the robotic arm 102 may be used for planning movement of the end effector 104. Controlling the end effector 104 may move more than one joint of the robotic arm 102. For example, when the end effector 104 is extended towards the object 112, the joint with the camera 108 may move. The robotic arm 102 includes at least one manipulator redundancy (e.g., elbow, shoulder, wrist joints, etc.). The two or more cameras (e.g., 106 and 108) may be used to track the object 112 even if one of the cameras has an occlusion in its field of view.

In an example, movement of the robotic arm 102 may be planned. The plan may include a path, such as including a first position as a starting position and a second position as an ending position. From there, joint angles may be computed using kinematics to determine a trajectory along the path. The path may include one or more positions between the first and second position. The path may include an orientation. In some examples, a random sampling of a path may be used to determine whether there is a collision. The trajectory may be determined to comply with the path, moving the end effector 104 to avoid collisions, and maintaining line of sight or at least partial line of sight to the object 112 from at least one of the cameras 106 or 108 during movement. In some examples, a velocity may be applied to a portion of the robotic arm 102 that does not the velocity of the end effector 104. Said another way, there may be multiple trajectories in the joints that result in a same trajectory in the end effector 104. The multiple trajectories may be used to obtain a trajectory to avoid camera occlusion. Either of camera 106 or 108 may be attached to the robotic arm 102 after market, be integrated into the robotic arm 102, etc.

Figure 2:
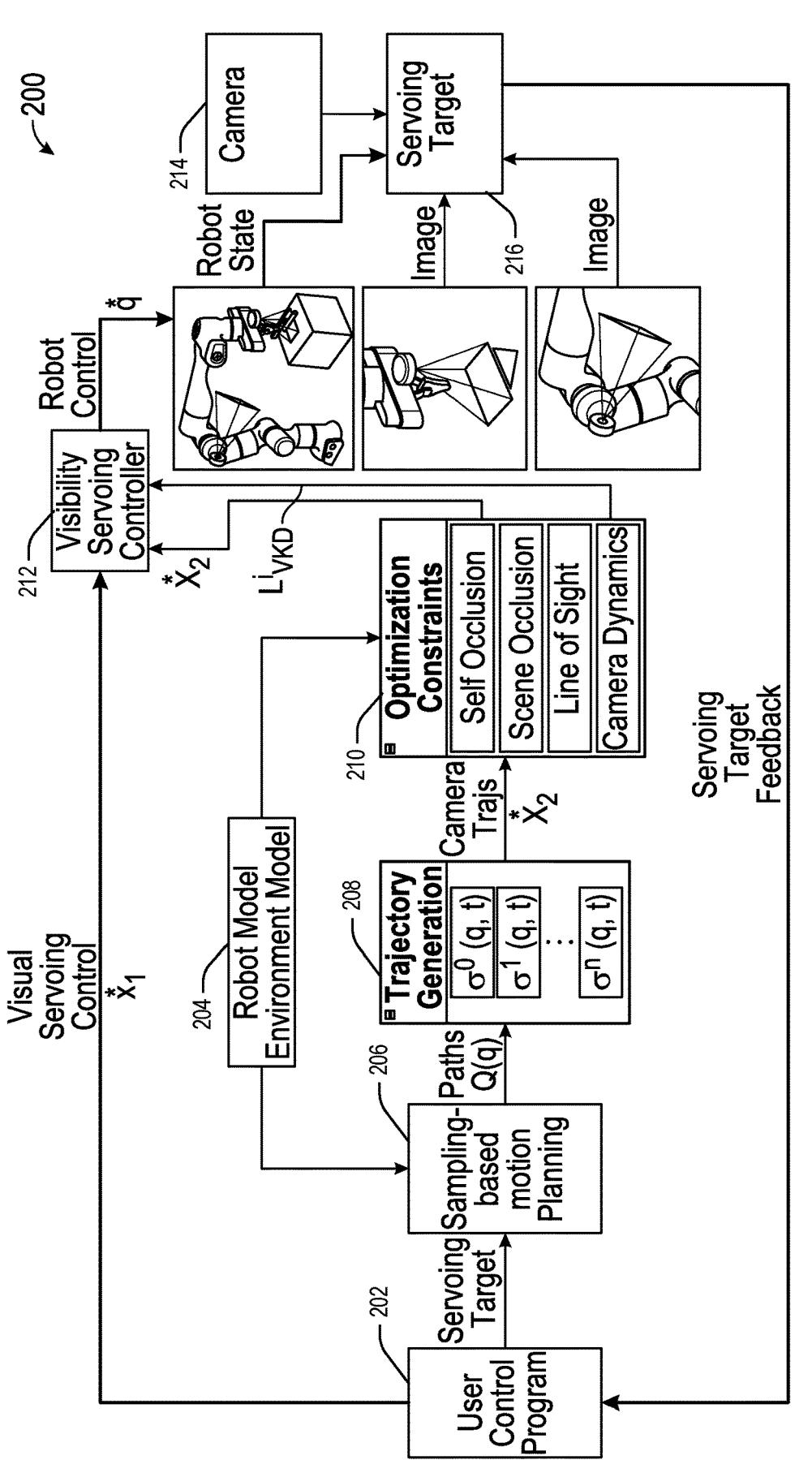
FIG. 2 illustrates a block diagram for camera and end-effector planning according to an example.

FIG. 2 illustrates a block diagram 200 for camera and end-effector planning according to an example. The block diagram 200 includes visual servoing components. For example, a user control program 202 may be used to provide a servoing target, which when used with a robot model or environment model 204, may be fed to a sampling-based motion planning block 206 to generate paths. A trajectory generation block 208 may use the paths to generate trajectories, which may be optimized by an optimization constraints block 210. An output control may be sent to a visibility servoing controller 212, which may use information rom the user control program 202 to output controls to a robot, for example including a camera 214, to move an end effector toward a servoing target 216.

One issue with visual servoing is that in some cases, an environment around a robot or the robot itself may occlude a camera line of sight to a particular object or location. Visual line of sight to a tracked target may be maintained for a one field of view of at least one camera using an extra degree of freedom of a redundant manipulator of the robot. For example, multiple path candidates may be computed using a sampling-based path planner as described herein. The candidates may be converted to trajectories and optimized using a multi-objective optimization technique. This optimization technique may evaluate an expected target tracking quality by combining a predicted track projection in an image, its visibility, and a motion blur that the camera motion causes. In some examples, a tracked target may be reprojected from a camera that has a best vantage point (e.g., line of sight) onto a camera image used by an existing algorithm (e.g., a camera on an end effector). This process may be done in real-time or near real-time, for example while motion of a robot is executed. A camera may be dynamically selected based on at least one optimization criterion, with smooth transitions between planned trajectories.

The block diagram 200 includes a visibility aware path planner. A technique to produce a path σ(q) (e.g., a sequence of joint configurations) from a given start configuration $q_s$ provided by robot encoders, and a set of n desired configurations $Q_g = \{q_{g0}, q_{g1}, \ldots, q_{gn}\}$ where the condition of having the object of interest inside the field of view of one camera fulfills, is depicted in the pseudo code below for SAMPLING_BASED_PATH_PLANNING.

This technique creates a directed graph (e.g., a Tree) starting from the initial configuration $q_s$ as the root node towards one of the final configurations provided, as a primary task, given that the connections between the nodes of this directed graph are collision-free or mitigated concerning the robot arm and the obstacles in the space. An object of interest $p_{obj} \in \mathbb{R}^3$ is kept in one camera field of view (FoV) as a secondary task. A reconnection stage is included to rewire the graph according to a specified cost function.

In particular, the technique starts by adding the start configuration as the root node of the directed graph (e.g., Tree). A random configuration for each joint may be generated uniformly from the physical boundaries of the robotic joints. The nodes inside a ball $B_r$, where r is the radius, and may be taken from the Tree, according to the L1 norm distance function (e.g., RANDOM). If no node is inside $B_r$, the closest node may be taken instead. The starting configuration may be considered the closest node until the graph is populated with new samples (e.g., NEAREST). A collision check may be performed for the closest node in the list. This test may be done by interpolating from $q_{closest}$ to $q_r$. For each configuration obtained, direct kinematics may be computed to obtain a cartesian position of each link of the robot arm. The positions of the links may be used to determine if any of them collide with the environment's obstacles. When a collision is detected, the random sample is rejected, and the technique continues to sample another configuration (e.g., COLLISION_FREE). When a collision-free sample is obtained, namely the vertex from $q_{closest}$ to $q_s$ is collision-free. The subset of configurations to the camera link is used to check if the object remains inside the FoV along the vertex. The configuration subset may be defined as joints that impact the camera's movement, or said another way, joints that are before the camera location in the kinematic chain. For each subset configuration, the direct kinematics are computed to obtain the cartesian pose of the camera, and the object position is reprojected with respect to the camera pose. When the object lies outside the frustum induced by the camera's FoV, the cost of that vertex is increased by $C_{FoV}$ factor plus the L1 distance from $q_r$ to $q_{closest}$.

When the object is in the vertex formed by $q_r$ and $q_{closest}$, the object is inside the FoV, and $q_r$ is added as a new node to the Tree graph with $q_{closest}$ as a parent with cost of the L1 distance from $q_r$ to $q_{closest}$. This portion of the technique allows trajectories that do not fulfill the secondary task (maintaining camera coverage). However, by adding the extra cost value at the reconnection stage of the technique, the result may asymptotically produce trajectories that ensure the secondary task.

When $q_r$ is close to a goal, for example when the L1 distance against one of the goals in $Q_g$ is less than a specified value (e.g., a constant), the technique may end and output the path by recursively pushing the parents from $q_r$ until $q_s$. By iterating this process, a set of paths $\sigma_i(q) \in Q$ may be generated.

Sample pseudo code may be used to generate sets of paths:

TABLE 1

```
SAMPLING_BASED_PATH_PLANNING
INPUT: q_s, Q_g={q_g0, q_g1, ..., q_gn}, p_obj
OUTPUT: σ(q)
Tree β INSERT(q_s)
WHILE TRUE:
```

5

TABLE 1-continued

```
q_r β RANDOM( )
q_nearest β NEAREST(q_r, Tree)
q_closest = q_nearest[0]
IF COLLISION_FREE(q_r, q_closest):
    IF FOV(q_r, q_closest, p_obj):
        cost = |q_r, q_closest|
    ELSE:
        cost = |q_r, q_closest| + C_FOV
    tree β INSERT(q_r, cost)
    FOREACH q_near IN q_nearest[1:]:
        IF COLLISION_FREE(q_r, q_near) AND
            IMPROVED_DISTANCE(q_r, q_near):
            IF FOV(q_r, q_near, p_obj):
                cost = |q_r, q_near|
            ELSE:
                cost = |q_r, q_near| + C_FOV
            tree β REWIRE(q_r, q_near, cost)
        ENDIF
    ENDFOREACH
    IF END_CONDITION(q_s, Q_g):
        σ(q) β CREATE_SOLUTION( )
        BREAK
    ENDIF
ENDIF
ENDWHILE
```

Visibility-aware kino-dynamic optimization and trajectory generation may be used to optimize the trajectories generated by the motion planner for improved target visibility and to select a best camera for a robot configuration. In some examples, the objective functions described below may be used to blend camera fields of view. A continuous cost function allows local refinement of parameters both in the kinematic and in the dynamic planning. In some examples, when planning is done via random sampling, the cost function may be used as a selection criterion. In other examples, when planning is based on optimization approaches, an observability cost may be added to a global objective function. The visual kino-dynamic planning may integrate seamlessly with discrete, continuous, or hybrid motion planners. The optimization criteria may include a self-occlusion cost term, a scene occlusion cost term, a visuo-dynamic cost term, or the like.

A self-occlusion or scene occlusion cost term may include an occlusion pixel-map, compensation for motion or other uncertainty sources, or a multiresolution cost, each of which is explained in further detail below. An occlusion pixel-map may be generated for the cost term. For each camera on the robot, a pixel-wise function $\psi(u \in N^2) \mapsto 0 \leq \kappa \leq 1 \in R$ associates a real value in the [0, 1] range to pixels. For example, 0 may represent fully occluded pixels and 1 may represent fully visible pixels, such as with respect to the workspace. These may be determined with known scene layout and robot joint state (e.g., including mesh models). This process exploits fast-rendering pipelines (e.g., without antialiasing and complex shaders) to generate pixel-wise values.

A compensation for motion and other uncertainty sources may be generated. Due to motion blur, encoder latencies and 6D registration of a scene are prone to uncertainties. A fast post processing is added to the previous map occlusion $\psi$ to partially model such complex effects. This may be adaptively modeled via an oriented convolution with a parametric Gabor filter $\phi$ allowing to directionally $$0 \leq \alpha \leq \frac{\pi}{2}$$

6 smear the occlusion map along the relative motion amplitude (e.g., via forward kinematics $E(J_1(q)\dot{q}_i, s_i)$) on each link, namely $\Gamma = \psi \odot \phi(\alpha, q_i)$. The result pixel map $\Gamma$ may better reflect, such as in terms of density per pixel, the visibility for each camera. The weighted integral of such visibility is used to choose the priorities of the view selection. The weight of such pixel-wise map $H(u \in N^2) \mapsto 0 \leq \kappa \leq 1 \in R$ may be considered the distortion of the camera. This means the further a pixel is away from the principal point $v$ of the camera, the more distortion it provides. In normalized terms this is expressed as in Eq. 1:

$$H_{v(u \in N^2)} := 1 - \left( \frac{w^2}{4} + \frac{h^2}{4} \right)^{\left( \frac{-1}{2} \right)} |u - v|. \qquad \text{Eq. 1}$$

Eq. 1 may be compounded into a visibility cost formally expressed as Eq. 2:

$$\mathcal{L}^s_{v_{\{w,h\}}} = \frac{1}{wh} \sum_{u(0,0)}^{u(w-1,h-1)} H_{v(u)} \cdot \Gamma(u, q, \dot{q}), \qquad \text{Eq. 2}$$

Eq. 2 encodes and normalizes variable resolution with respect to the dimensions w and h for the visibility in each camera s while running in a compact computational envelopment.

A multiresolution cost may be determined, such as for gaussian pyramidal acceleration. To reliably minimize the computation latency and energy consumption, a multiresolution $(w \cdot 2^{-L}, h \cdot 2^{-L})$ approach may be applied to the computation of $\mathcal{L}^s \{w \cdot 2^{-L}, h \cdot 2^{-L}\}$. This application exploits the higher subsampling selection level $L \in \{4,3,2\}$ of an active camera subset $s_i, s_j, \ldots, s_k$. Based on this formulation, a first comparisons (e.g., among all cameras) may be computed at low resolution, with increasing resolution L=1 only for the active view in some examples.

A visuo-dynamic cost term may be generated. Fast motion or accelerations may cause motion blur on the cameras. This effect may cause the visual servoing target tracking to fail, therefore it is important to consider it as part of the optimization process. Motion blur depends mostly on two factors: the camera shutter speed ($\in_s$) and tracked object velocity relative to the camera ($v_o$). For static objects, motion blur is caused mostly by camera motion and distance to the object. The visuo-dynamic cost term includes a function of those quantities: $\mathcal{L}_a (v_o, \in_s)$. Both $v_o$, $\in_s$ may be observable parameters. $v_o$ depends on the camera and object motion, which may be computed using the calibrated robot forward kinematics and the location of the tracked object. $\in_s$ changes in time and may be queried for each camera when needed.

A visuo-kino-dynamic optimized trajectory may be generated from the above costs. The different optimization objectives described above may be combined into a weighted objective function. The objective function may compute a sum of the partial objectives for each path waypoint, as expressed in Eq. 3, where $w_v \mathcal{L}_v (q, \dot{q})$ is the quantity of occlusion and $w_d \mathcal{L}_d(\dot{q}, \in_s)$ is the resulting motion:

$$\mathcal{L}_{VKD}(\sigma) = \frac{1}{|\sigma|} \sum_{q,\dot{q} \in \sigma} w_v \mathcal{L}_v(q, \dot{q}) + w_d \mathcal{L}_d(\dot{q}, \epsilon_s) \qquad \text{Eq. 3}$$

By using $\mathcal{L}V_{KD}(\sigma)$, motion plans may be ranked by suitability for visual-servoing tasks. Visual-servoing is also called vision based robot control and refers to controlling actions of a robot using visual feedback (e.g., via a camera). The best path may be converted into a trajectory using a trajectory scaling algorithm. In some examples, a trajectory scaling may be tweaked by the cost function. This allows generated trajectories to avoid excessive motion blur and other dynamical effects that motion may cause in visual servoing tasks.

A visibility servoing controller may be generated. After trajectory generation, there are two control tasks for solving together. These tasks include visual servoing, which provides a desired velocity in the end-effector task-space $\dot{x}_1{}^d$, and a visibility-aware planning, which provides a desired velocity in the camera task-space $\dot{x}_2{}^d$. The visual servoing task may provide velocity commands at each sampling time. To closely follow the visual servoing velocity commands high frequency replanning may be needed. The visibility-aware planner approximately follows such velocity commands and produces a trajectory for the secondary camera that maintains visibility of the target. In this way, the visibility-aware planner considers the visual servoing tasks but in a computationally efficient way that may not perfectly perform the visual servoing task. To ensure that the visual servoing tracking is not affected by the visibility-aware planner, a priority-task based approach may be used. Based on differential kinematics, the velocity in the end-effector task-space may be related to the joint velocities q by Eq. 4:

$$\dot{x}_1^d = J_1(q)\dot{q} \qquad \text{Eq. 4}$$

where $J_1(q)$ is the Jacobian matrix which relates to compare joint velocities into with cartesian velocities, the joint velocities, having in general being an extra degrees of freedom, i.e., the number of degrees of freedom is greater than six. Since the robot has at least one redundancy in movement (e.g., degree of freedom), the number of columns in $J_1(q)$ is larger than the number of rows. According to generalized inverse matrix theory, a solution to Eq. 4 may be given by Eq. 5:

$$\dot{q} = J_1(q)^+ \dot{x}_1^d + N_1(q)\dot{q}_0 \qquad \text{Eq. 5}$$

where $J_1(q)^+$ is the pseudoinverse of $J_1(q)$, and $N_1(q){=}(I{-}J_1(q){+}J_1(q))$ is the null space of $J_1(q)$. In Eq. 5, $\dot{q}_0$ is an arbitrary joint velocity vector. Eq. 5 may be used to determine the velocity in the end-effector task-space while having one or more additional degrees of freedom to perform another task. The null space solution includes possible velocities produced for the joints that do not affect (e.g., are independent of) the trajectory of the end effector. Eq. 5 characterizes multiple solutions to Eq. 4 due to the redundancy of the robot. $\dot{x}_2{}^d$, from the task to determine a velocity in the camera task-space, is related to the joint velocities by Eq. 6:

$$\dot{x}_2^d = J_2(q)\dot{q} \qquad \text{Eq. 6}$$

Substituting Eq. 5 into Eq. 6 yields Eq. 7:

$$\dot{x}_2^d = J_2(q)J_1(q)^+ \dot{x}_1^d + J_2(q)N_1(q)\dot{q}_0 \qquad \text{Eq. 7}$$

When Eq. 7 has a solution for $\dot{q}_0$, then both velocity tasks (e.g., for the end-effector and the camera) may be achieved. When both tasks are not achievable together, then Eq. 8 may be used:

$$\dot{q}_0 = \tilde{J}_2(q)^+ \left( \dot{x}_2^d - J_2(q)J_1(q)^+ \dot{x}_1^d \right) \qquad \text{Eq. 8}$$

where $\tilde{J}_2(q){=}J_2(q)N_1(q)$, represents a solution that solves the optimization problem of Eq. 9:

$$\min_{\dot{q}_0} \left\| \dot{x}_2^d - J_2(q)\dot{q}_0 \right\| \qquad \text{Eq. 9}$$

Eq. 8 and Eq. 9 may be used to approximate the camera task while solving the end-effector task. Task compatibility may be used to select among trajectories for the camera task. For example, consider two possible trajectories for the camera task: $_a\dot{x}_2{}^d$ and $_b\dot{x}_2{}^d$. In an example, $_a\dot{x}_2{}^d$ is more compatible with the end-effector task than $_b\dot{x}_2{}^d$ when $_a\dot{x}_2{}^d$ has a lower value when evaluated in Eq. 9. This property may be used to select among multiple possible trajectories for the camera task, during the visibility-aware planning stage or to refine or improve a previous plan.

Figures 3A, 3B:
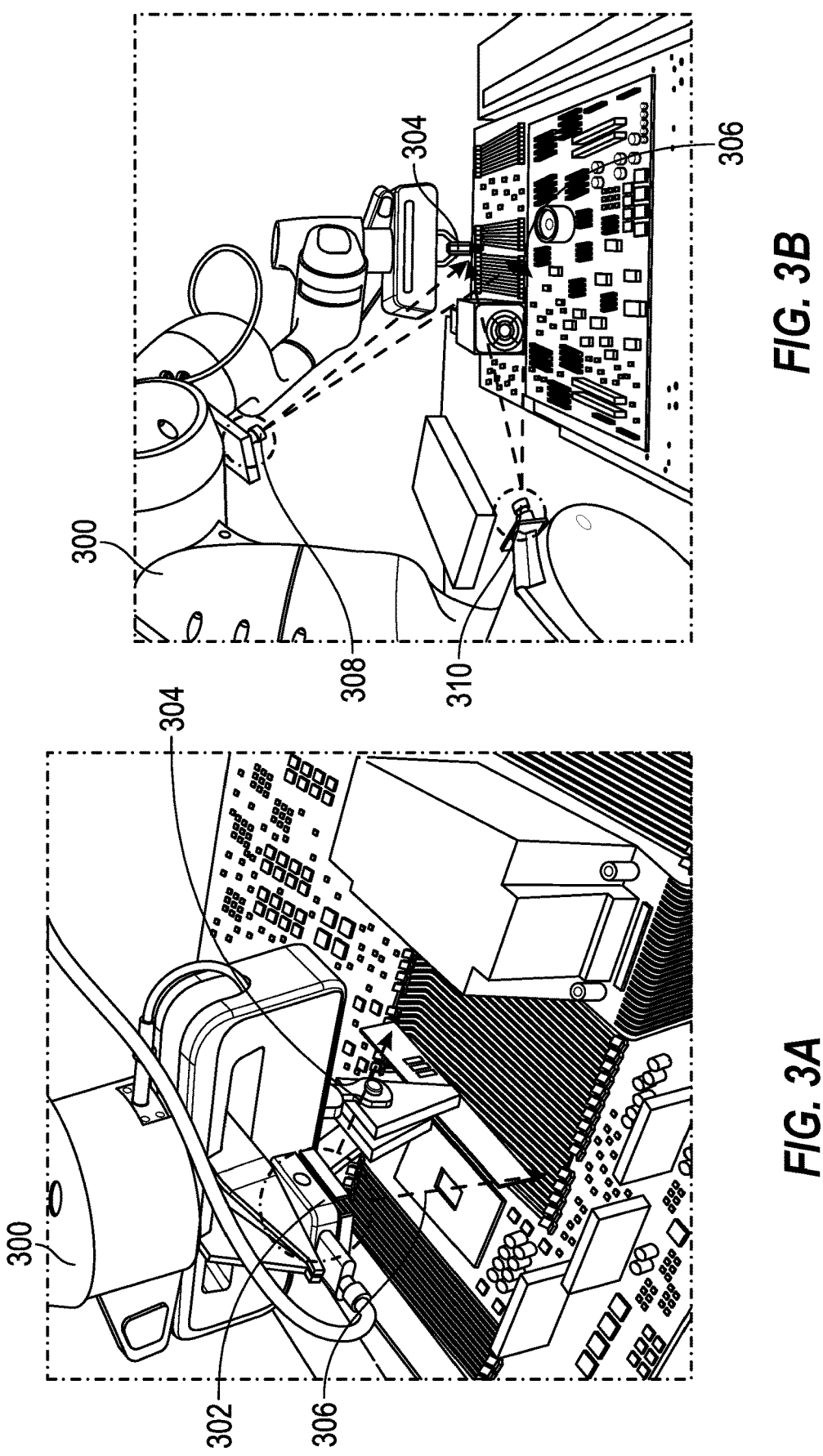
FIGS. 3A-3B illustrate object occlusion examples according to an example.

FIGS. 3A-3B illustrate object occlusion examples according to an example. FIGS. 3A and 3B include a robotic arm 300, an end effector 304, and a target 306 object or space. FIG. 3A shows an end effector camera 302 that has an occluded line of sight to the target 306 (e.g., by the end effector 304). FIG. 3B shows two joint cameras 308 and 310, which each have a line of sight to the target 306.

FIG. 3A illustrates an example of an object occluding the camera 302. This example shows a memory DIMM in the FoV of the end-effector camera 302 that occludes a memory slot and visual tracked markers used for memory insertion. FIG. 3B illustrates two cameras 308 and 310 that may be used to address the occlusion problem of camera 302 by compensating the deficient FoV of the camera 302. As described herein, one or more of the additional cameras 308 or 310 may be used to maintain the FoV during the motion. Images captured by the camera 308 or 310 may be projected to the orientation of camera 302 to compensate transparently to a servoing algorithm to move the robotic arm 300.

Figure 4:
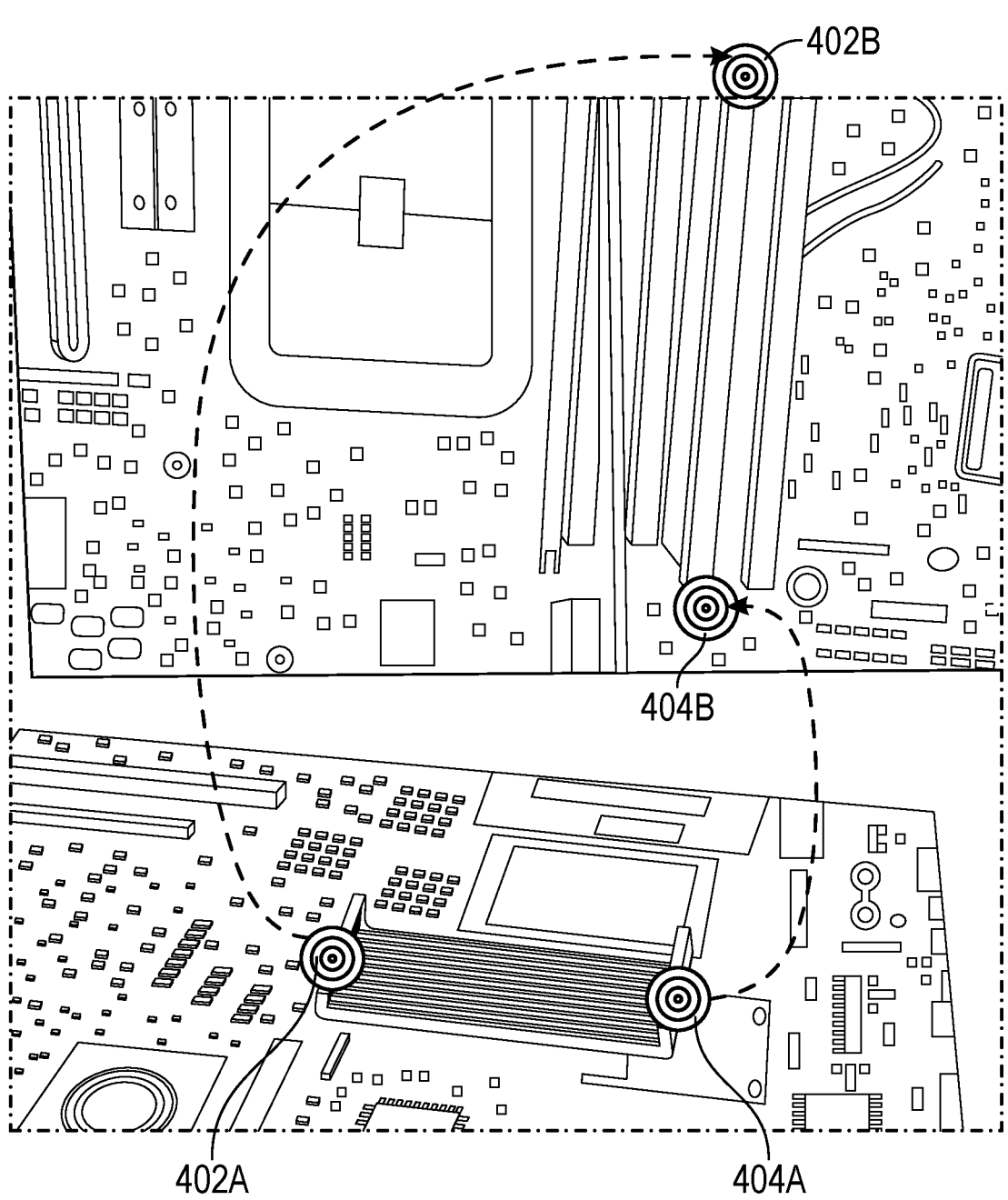
FIG. 4 illustrates target points in an image and a projection according to an example.

FIG. 4 illustrates target points 402A-B and 404A-B in an image and a projection according to an example. In FIG. 4, target points 402A and 404A are reprojected from an image captured for example by a joint camera (e.g., camera 308 or 310 of FIG. 3B). The target points 402A and 404A are projected to an orientation of an end effector camera (e.g., camera 302 of FIG. 3A) as target points 402B and 404B. The use of target points 402A and 404A may occur when at least one target is out of the field of view of an end effector camera or when a target is occluded, for example by a portion of the robot.

Reprojection or projection of an image or points of an image into another orientation may be performed to transfer information from an image captured by one camera for use in an algorithm or technique that relies on a viewpoint of another camera This servoing target reprojection may be used to maintain target point visibility from any robot camera. A visual servoing application may use a single camera to control the robot. Using camera calibration, camera projection parameters may be determined along with their relative position and orientation to the robot link where each is attached. This information may be used to map points from one image to another (e.g., reprojection). The servoing reprojection may be used to project the visual servoing targets from the active camera to the camera used to run a servoing algorithm or technique. Existing workflows may use the reprojection to enable the usage of multiple camera systems without redoing the algorithm or technique based on the camera used.

Figure 5:
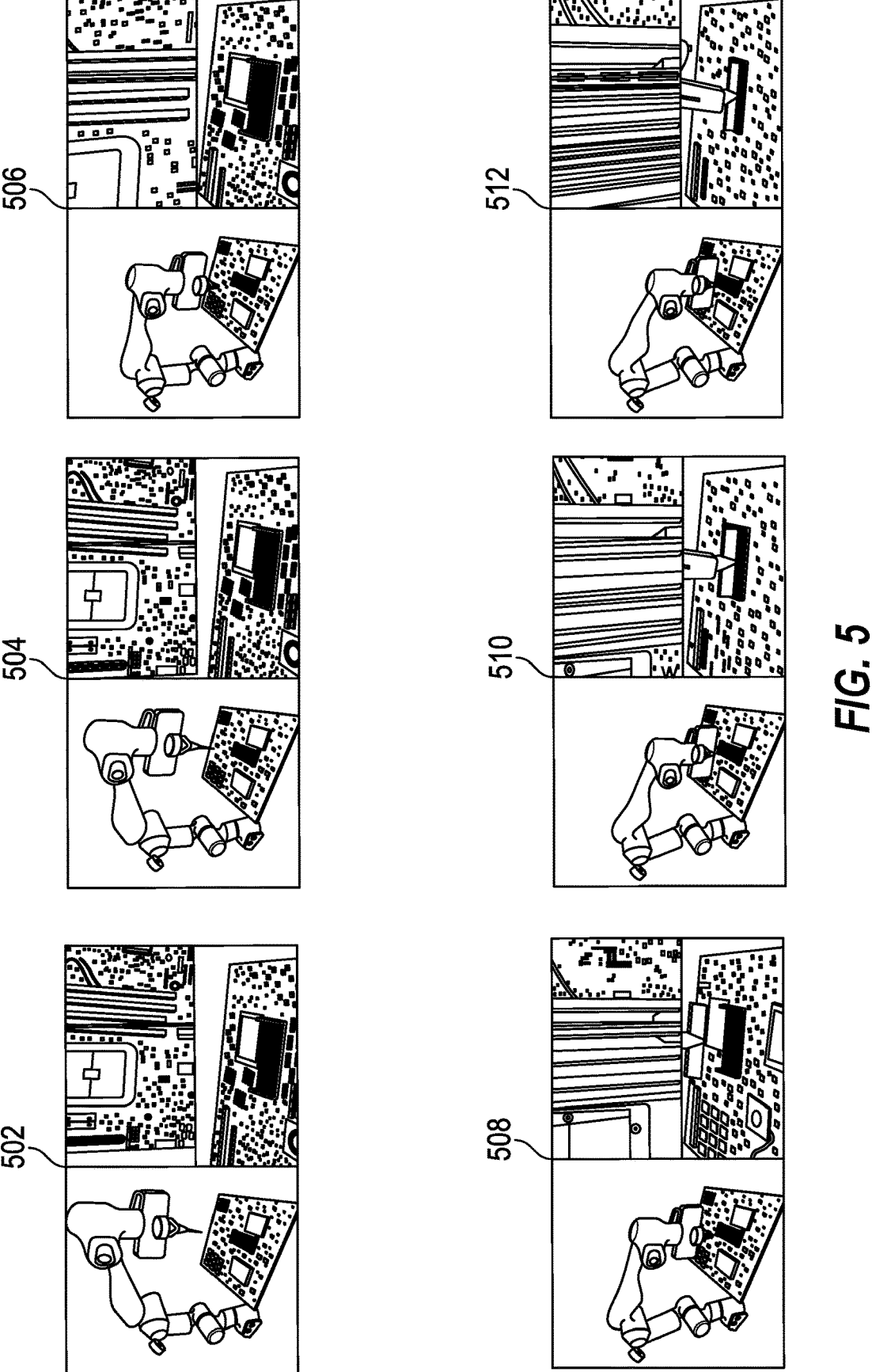
FIG. 5 illustrates a sequence of snapshots for a visual servoing task according to an example.

FIG. 5 illustrates a sequence of snapshots 502-512 for a visual servoing task according to an example. FIG. 5 includes a sequence of snapshots 502-512 from a visual servoing task including an objective to insert a DIMM module into a target DIMM slot on a motherboard. Each snapshot 502-512 shows a third person view on the left and images from two robot cameras on the right (e.g., an end effector camera on the top right and a joint camera on the bottom right). For example, the cameras may include a wrist mounted camera (top right) and a camera mounted on a fourth link (bottom right). Key points used for performing visual servoing in this example are the latches for the target slot. The visual servoing technique may use the wrist mounted camera as input to control the robotic arm. When the wrist mounted camera approaches close to the insertion position, the DIMM in the gripper occludes the target key points used for visual servoing. At this point, the camera on the fourth link may be used to provide the key points that guide the final insertion motion. By projecting the key points detected by the fourth link camera to the wrist camera, the original visual servoing algorithm or technique may continue operating even under occlusion or when the key points are out of the wrist camera FoV.

The sequence of snapshots includes an initial insertion state 502, a frame when self-occlusion of key points start 504, a frame where all key points are out of view or occluded 506 a frame where the fourth link camera is used to detect key points 508, a frame where visual servoing may continue using the fourth link camera 510, and a frame where the task has been completed successfully 512.

FIG. 6 illustrates a flowchart showing a technique 600 for camera and end-effector planning according to an example. The technique 600 may be performed by a device or devices in an edge or datacenter network (e.g., an orchestrator, a base station, a server, a mobile device, an IoT device, or the like), by an autonomous mobile robot (AMR), etc.

The technique 600 includes an operation 602 to generate, for example using processing circuitry, a set of paths of an end effector of a robotic arm. Operation 602 may include attempting to satisfy a visual-servoing task to provide a set of velocities in an end-effector task-space and satisfying a visibility-aware planning task to provide a velocity in a camera task-space. To satisfy the visibility-aware planning task, this operation may include determining a plurality of velocities, including the velocity, the plurality of velocities not affecting a trajectory of the end effector (e.g., being independent of the trajectory). In an example, when at least one of the tasks cannot be satisfied, the set of paths may be determined according to an optimization that satisfies the visual-servoing task while minimizing a deviation from the velocity in the camera task-space.

The technique 600 includes an operation 604 to rank the set of paths using an objective function that results in an improvement to a distance between the end effector and a target while maintaining a collision mitigation path (e.g., collision free path) for the end effector and minimizing occlusion of a camera affixed to a joint of the robotic arm. In some examples, occlusion of the camera may be eliminated in one or more paths of the ranked paths of operation 604. In an example, operation 604 may include using optimization constraints including at least one of minimizing self-occlusion, minimizing scene occlusion, maintaining line of sight, minimizing camera dynamics, or the like. The optimization constraints may include at least one of maintaining the second camera affixed to the end effector or the camera affixed to the joint of the robotic arm occlusion mitigation.

The technique 600 includes an operation 606 to convert a path of the set of paths into a trajectory based on the ranking. The technique 600 includes an operation 608 to output the trajectory for controlling the robotic arm to move the end effector. Operation 608 may include outputting control signals for manipulating a set of motors of the robotic arm to apply at least one velocity to a link of the robotic arm that does not affect (e.g., is independent of) a velocity of the end effector.

In an example, the technique 600 may include capturing a first image using a second camera affixed to the end effector, identifying an occlusion in the first image, and receiving a second image form the camera affixed to the joint of the robotic arm. In this example, outputting the trajectory may include outputting a control signal to control the robotic arm based on the second image. This example may include projecting the second image into a perspective corresponding to the second camera affixed to the end effector.

The technique 600 may include receiving a trajectory for the end effector of the robotic arm, and identifying a next position for the end effector from the trajectory. In this example, generating the set of paths of the end effector of the robotic arm may include using an image captured by the camera on the joint of the robotic arm.

FIG. 7 illustrates a flowchart showing a technique 700 for controlling a robotic arm using a joint camera image according to an example. The technique 700 may be performed by a device or devices in an edge or datacenter network (e.g., an orchestrator, a base station, a server, a mobile device, an IoT device, or the like), by an AMR, etc.

The technique 700 includes an operation 702 to receive a first image from an end effector camera affixed to a robotic arm. The technique 700 includes an operation 704 to identify an occlusion in the first image. The technique 700 includes an operation 706 to receive a second image from a joint camera affixed to a joint of the robotic arm. The technique 700 includes an optional operation 708 to project the second image into a perspective corresponding to the end effector camera (e.g., as described above with respect to FIG. 4). The technique 700 includes an operation 710 to output a control signal to control the robotic arm based on a movement algorithm using the projected second image.

Figure 8:
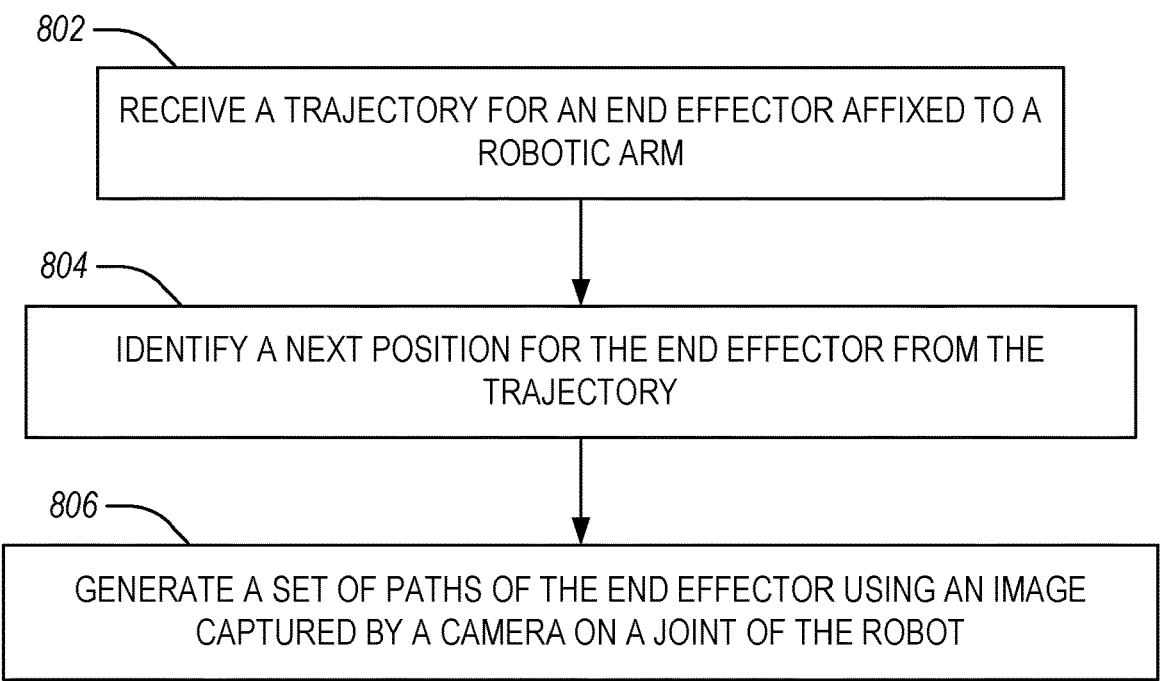
FIG. 8 illustrates a flowchart showing a technique for generating a path from a trajectory of an end effector of a robotic arm according to an example.

FIG. 8 illustrates a flowchart showing a technique 800 for generating a path from a trajectory of an end effector of a robotic arm according to an example. The technique 800 may be performed by a device or devices in an edge or datacenter network (e.g., an orchestrator, a base station, a server, a mobile device, an IoT device, or the like), by an AMR, etc.

The technique 800 includes an operation 802 to receive a trajectory for an end effector affixed to a robotic arm. The trajectory may be generated as described above with respect to FIG. 2. The technique 800 includes an operation 804 to identify a next position for the end effector from the trajectory. In some examples, a plurality of next positions may be determined. The technique 800 includes an operation 806 to generate a set of paths of the end effector using an image captured by a camera on a joint of the robot. The set of paths may be generated according to a camera field of view, occlusion of a camera, etc.

FIG. 9 illustrates a flowchart showing a technique 900 for optimizing a path of an end effector of a robotic arm for camera visibility to a target according to an example. The technique 900 may be performed by a device or devices in an edge or datacenter network (e.g., an orchestrator, a base station, a server, a mobile device, an IoT device, or the like), by an AMR, etc.

The technique 900 includes an operation 902 to receive a trajectory of an end effector affixed to a robotic arm. The technique 900 includes an operation 904 to determine whether a visual-servoing task to provide a set of velocities in an end-effector task-space and a visibility-aware planning task to provide a velocity in a camera task-space can both be satisfied for the trajectory. When both tasks can be satisfied for the trajectory, that trajectory may be used. The technique 900 includes an operation 906 to, in response to determining that at least one of the tasks cannot be satisfied, generate a set of paths of the end effector for the trajectory according to an optimization that satisfies the visual-servoing task while minimizing a deviation from the velocity in the camera task-space.

In further examples, any of the compute nodes or devices discussed with reference to the present edge computing systems and environment may be fulfilled based on the components depicted in FIGS. 10A and 10B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 10A:
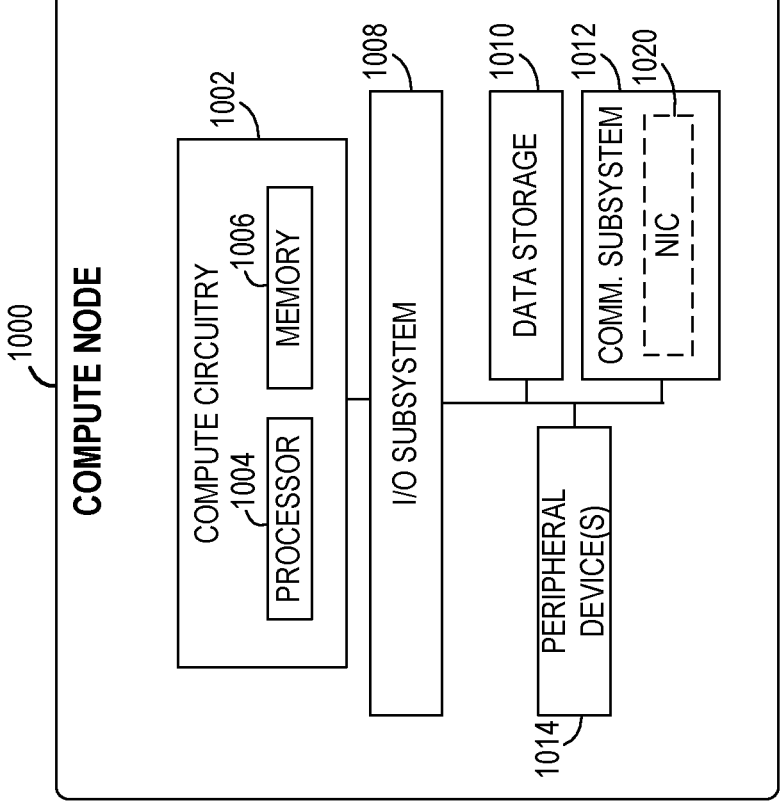
FIG. 10A provides an overview of example components for compute deployed at a compute node.

In the simplified example depicted in FIG. 10A, an edge compute node 1000 includes a compute engine (also referred to herein as "compute circuitry") 1002, an input/output (I/O) subsystem 1008, data storage 1010, a communication circuitry subsystem 1012, and, optionally, one or more peripheral devices 1014. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1000 may be embodied as any type of engine, device, or collection of devices capable of performing various compute functions. In some examples, the compute node 1000 may be embodied as a single device such as an integrated circuit, an embedded system, a field-programmable gate array (FPGA), a system-on-a-chip (SOC), or other integrated system or device. In the illustrative example, the compute node 1000 includes or is embodied as a processor 1004 and a memory 1006. The processor 1004 may be embodied as any type of processor capable of performing the functions described herein (e.g., executing an application). For example, the processor 1004 may be embodied as a multi-core processor(s), a microcontroller, a processing unit, a specialized or special purpose processing unit, or other processor or processing/controlling circuit.

In some examples, the processor 1004 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1004 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1004 may work in coordination with each other to execute many types of operations and instructions within and on behalf of the compute node 1000.

The memory 1006 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1006 may be integrated into the processor 1004. The memory 1006 may store various software and data used during operation such as one or more applications, data operated on by the application(s), libraries, and drivers.

The compute circuitry 1002 is communicatively coupled to other components of the compute node 1000 via the I/O subsystem 1008, which may be embodied as circuitry and/or components to facilitate input/output operations with the compute circuitry 1002 (e.g., with the processor 1004 or the main memory 1006) and other components of the compute circuitry 1002. For example, the I/O subsystem 1008 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1008 may form a portion of a system-on-a-chip (SoC) and be incorporated, along with one or more of the processor 1004, the memory 1006, and other components of the compute circuitry 1002, into the compute circuitry 1002.

The one or more illustrative data storage devices 1010 may be embodied as any type of devices configured for short-term or long-term storage of data such as, for example, memory devices and circuits, memory cards, hard disk drives, solid-state drives, or other data storage devices. Individual data storage devices 1010 may include a system partition that stores data and firmware code for the data storage device 1010. Individual data storage devices 1010 may also include one or more operating system partitions that store data files and executables for operating systems depending on, for example, the type of compute node 1000.

The communication circuitry 1012 may be embodied as any communication circuit, device, or collection thereof, capable of enabling communications over a network between the compute circuitry 1002 and another compute device (e.g., a gateway of an implementing computing system). The communication circuitry 1012 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1012 includes a network interface controller (NIC) 1020, which may also be referred to as a host fabric interface (HFI). The NIC 1020 may be embodied as one or more add-in-boards, daughter cards, network interface cards, controller chips, chipsets, or other devices that may be used by the compute node 1000 to connect with another compute device (e.g., a gateway node). In some examples, the NIC 1020 may be embodied as part of a system-on-a-chip (SoC) that includes one or more processors, or included on a multichip package that also contains one or more processors. In some examples, the NIC 1020 may include a local processor (not shown) and/or a local memory (not shown) that are both local to the NIC 1020. In such examples, the local processor of the NIC 1020 may be capable of performing one or more of the functions of the compute circuitry 1002 described herein. Additionally, or alternatively, in such examples, the local memory of the NIC 1020 may be integrated into one or more components of the client compute node at the board level, socket level, chip level, or other levels.

Additionally, in some examples, a respective compute node 1000 may include one or more peripheral devices 1014. Such peripheral devices 1014 may include any type of peripheral device found in a compute device or server such as audio input devices, a display, other input/output devices, interface devices, and/or other peripheral devices, depending on the particular type of the compute node 1000. In further examples, the compute node 1000 may be embodied by a respective compute node (whether a client, gateway, or aggregation node) in a computing system or like forms of appliances, computers, subsystems, circuitry, or other components.

Figure 10B:
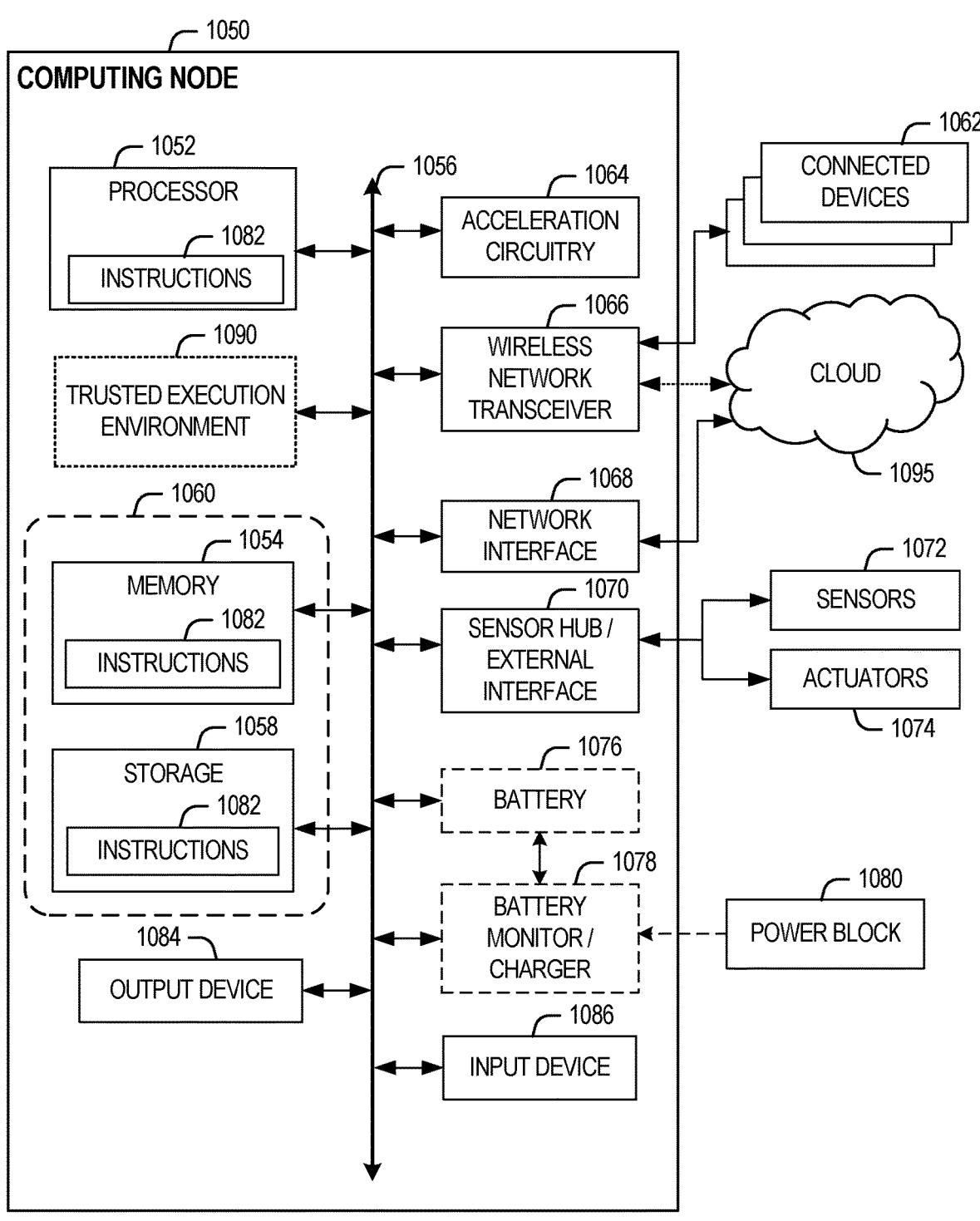
FIG. 10B provides a further overview of example components within a computing device.

In a more detailed example, FIG. 10B illustrates a block diagram of an example of components that may be present in a computing node 1050 for implementing the techniques (e.g., operations, processes, methods, and methodologies) described herein. This computing node 1050 provides a closer view of the respective components of node 1000 when implemented as or as part of a computing device (e.g., as a mobile device, a base station, server, gateway, etc.). The computing node 1050 may include any combinations of the hardware or logical components referenced herein, and it may include or couple with any device usable with a communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 1050, or as components otherwise incorporated within a chassis of a larger system.

The computing device 1050 may include processing circuitry in the form of a processor 1052, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1052 may be a part of a system on a chip (SoC) in which the processor 1052 and other components are formed into a single integrated circuit, or a single package, such as the Edison™ or Galileo™ SoC boards from Intel Corporation, Santa Clara, California. As an example, the processor 1052 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1052 and accompanying circuitry may be provided in a single socket form factor, multiple socket form factor, or a variety of other formats, including in limited hardware configurations or configurations that include fewer than all elements shown in FIG. 10B.

The processor 1052 may communicate with a system memory 1054 over an interconnect 1056 (e.g., a bus). Any number of memory devices may be used to provide for a given amount of system memory. As examples, the memory 1054 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1058 may also couple to the processor 1052 via the interconnect 1056. In an example, the storage 1058 may be implemented via a solid-state disk drive (SSDD). Other devices that may be used for the storage 1058 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1058 may be on-die memory or registers associated with the processor 1052. However, in some examples, the storage 1058 may be implemented using a micro hard disk drive (HDD). Further, any number of new technologies may be used for the storage 1058 in addition to, or instead of, the technologies described, such resistance change memories, phase change memories, holographic memories, or chemical memories, among others.

The components may communicate over the interconnect 1056. The interconnect 1056 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1056 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1056 may couple the processor 1052 to a transceiver 1066, for communications with the connected devices 1062. The transceiver 1066 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 1062. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1066 (or multiple transceivers) may communicate using multiple standards or radios for communications at a different range. For example, the computing node 1050 may communicate with close devices, e.g., within about 10 meters, using a local transceiver based on Bluetooth Low Energy (BLE), or another low power radio, to save power. More distant connected devices 1062, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1066 (e.g., a radio transceiver) may be included to communicate with devices or services in the cloud 1095 via local or wide area network protocols. The wireless network transceiver 1066 may be a low-power wide-area (LPWA) transceiver that follows the IEEE 802.15.4, or IEEE 802.15.4g standards, among others. The computing node 1050 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1066, as described herein. For example, the transceiver 1066 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1066 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1068 may be included to provide a wired communication to nodes of the cloud 1095 or to other devices, such as the connected devices 1062 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1068 may be included to enable connecting to a second network, for example, a first NIC 1068 providing communications to the cloud over Ethernet, and a second NIC 1068 providing communications to other devices over another type of network.

Given the variety of types of applicable communications from the device to another component or network, applicable communications circuitry used by the device may include or be embodied by any one or more of components 1064, 1066, 1068, or 1070. Accordingly, in various examples, applicable means for communicating (e.g., receiving, transmitting, etc.) may be embodied by such communications circuitry.

The computing node 1050 may include or be coupled to acceleration circuitry 1064, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 1056 may couple the processor 1052 to a sensor hub or external interface 1070 that is used to connect additional devices or subsystems. The devices may include sensors 1072, such as accelerometers, level sensors, flow sensors, optical light sensors, camera sensors, temperature sensors, global navigation system (e.g., GPS) sensors, pressure sensors, barometric pressure sensors, and the like. The hub or interface 1070 further may be used to connect the computing node 1050 to actuators 1074, such as power switches, valve actuators, an audible sound generator, a visual warning device, and the like.

In some optional examples, various input/output (I/O) devices may be present within or connected to, the computing node 1050. For example, a display or other output device 1084 may be included to show information, such as sensor readings or actuator position. An input device 1086, such as a touch screen or keypad may be included to accept input. An output device 1084 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 1050. A display or console hardware, in the context of the present system, may be used to provide output and receive input of a computing system; to manage components or services of a computing system; identify a state of a computing component or service; or to conduct any other number of management or administration functions or service use cases.

A battery 1076 may power the computing node 1050, although, in examples in which the computing node 1050 is mounted in a fixed location, it may have a power supply coupled to an electrical grid, or the battery may be used as a backup or for temporary capabilities. The battery 1076 may be a lithium ion battery, or a metal-air battery, such as a zinc-air battery, an aluminum-air battery, a lithium-air battery, and the like.

A battery monitor/charger 1078 may be included in the computing node 1050 to track the state of charge (SoCh) of the battery 1076, if included. The battery monitor/charger 1078 may be used to monitor other parameters of the battery 1076 to provide failure predictions, such as the state of health (SoH) and the state of function (SoF) of the battery 1076. The battery monitor/charger 1078 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1078 may communicate the information on the battery 1076 to the processor 1052 over the interconnect 1056. The battery monitor/charger 1078 may also include an analog-to-digital (ADC) converter that enables the processor 1052 to directly monitor the voltage of the battery 1076 or the current flow from the battery 1076. The battery parameters may be used to determine actions that the computing node 1050 may perform, such as transmission frequency, mesh network operation, sensing frequency, and the like.

A power block 1080, or other power supply coupled to a grid, may be coupled with the battery monitor/charger 1078 to charge the battery 1076. In some examples, the power block 1080 may be replaced with a wireless power receiver to obtain the power wirelessly, for example, through a loop antenna in the computing node 1050. A wireless battery charging circuit, such as an LTC4020 chip from Linear Technologies of Milpitas, California, among others, may be included in the battery monitor/charger 1078. The specific charging circuits may be selected based on the size of the battery 1076, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1058 may include instructions 1082 in the form of software, firmware, or hardware commands to implement the techniques described herein. Although such instructions 1082 are shown as code blocks included in the memory 1054 and the storage 1058, it may be understood that any of the code blocks may be replaced with hardwired circuits, for example, built into an application specific integrated circuit (ASIC).

In an example, the instructions 1082 provided via the memory 1054, the storage 1058, or the processor 1052 may be embodied as a non-transitory, machine-readable medium 1060 including code to direct the processor 1052 to perform electronic operations in the computing node 1050. The processor 1052 may access the non-transitory, machine-readable medium 1060 over the interconnect 1056. For instance, the non-transitory, machine-readable medium 1060 may be embodied by devices described for the storage 1058 or may include specific storage units such as optical disks, flash drives, or any number of other hardware devices. The non-transitory, machine-readable medium 1060 may include instructions to direct the processor 1052 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1082 on the processor 1052 (separately, or in combination with the instructions 1082 of the machine readable medium 1060) May configure execution or operation of a trusted execution environment (TEE) 1090. In an example, the TEE 1090 operates as a protected area accessible to the processor 1052 for secure execution of instructions and secure access to data. Various implementations of the TEE 1090, and an accompanying secure area in the processor 1052 or the memory 1054 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1050 through the TEE 1090 and the processor 1052.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically program- mable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmis- sion medium via a network interface device utilizing any one of a number of transfer protocols (e.g., Hypertext Transfer Protocol (HTTP)).

A machine-readable medium may be provided by a stor- age device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The infor- mation representative of the instructions in the machine- readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or oth- erwise manipulating the information into the instructions.

In an example, the derivation of the instructions may include assembly, compilation, or interpretation of the infor- mation (e.g., by the processing circuitry) to create the instructions from some intermediate or preprocessed format provided by the machine-readable medium. The informa- tion, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation indepen- dence. Such components may be embodied by any number of software or hardware forms. For example, a component or module may be implemented as a hardware circuit compris- ing custom very-large-scale integration (VLSI) circuits or gate arrays, off-the-shelf semiconductors such as logic chips, transistors, or other discrete components. A component or module may also be implemented in programmable hard- ware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a net- work, using one or more platforms, wirelessly, via a soft- ware component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non- limiting examples may stand on its own or may be combined in any permutation or combination with any one or more of the other examples provided below or throughout the present disclosure.

Each of these non-limiting examples may stand on its own, or may be combined in various permutations or com- binations with one or more of the other examples.

Example 1 is at least one machine-readable medium, including instructions, which when executed by processing circuitry, cause the processing circuitry to perform opera- tions to: generate a set of paths of an end effector of a robotic arm; determine a ranking of the set of paths using an objective function that results in a decrease in a distance between the end effector and a target while maintaining a collision mitigation path for the end effector and minimizing occlusion of a camera affixed to a joint of the robotic arm; convert a path of the set of paths into a trajectory based on the ranking; and output the trajectory to cause control of the robotic arm to move the end effector.

In Example 2, the subject matter of Example 1 includes, wherein the operations further cause the processing circuitry to: capture a first image using a second camera affixed to the end effector; and identify an occlusion in the first image.

In Example 3, the subject matter of Example 2 includes, wherein to output the trajectory, the operations include outputting a control signal to control the robotic arm based on a second image received from the camera affixed to the joint of the robotic arm.

In Example 4, the subject matter of Examples 2-3 includes, operations to project a second image received from the camera affixed to the joint of the robotic arm into a perspective corresponding to the second camera affixed to the end effector.

In Example 5, the subject matter of Examples 1-4 includes, wherein to rank the set of paths using the objective function, the operations include using optimization constraints including at least one of minimizing self-occlusion, minimizing scene occlusion, maintaining line of sight, or minimizing camera dynamics.

In Example 6, the subject matter of Example 5 includes, wherein the optimization constraints include at least one of maintaining a field of view of a second camera affixed to the end effector or a field of view of the camera affixed to the joint of the robotic arm occlusion mitigation.

In Example 7, the subject matter of Examples 1-6 includes, wherein the operations further cause the processing circuitry to: receive a trajectory for the end effector of the robotic arm; and identify a next position for the end effector from the trajectory; and wherein to generate the set of paths of the end effector of the robotic arm, the operations include using an image captured by the camera on the joint of the robotic arm.

In Example 8, the subject matter of Examples 1-7 includes, wherein to output the trajectory, the operations include outputting control signals for manipulating a set of motors of the robotic arm to apply at least one velocity to a link of the robotic arm that is independent of a velocity of the end effector.

In Example 9, the subject matter of Examples 1-8 includes, wherein to generate the set of paths, the operations include attempting to satisfy a visual-servoing task to provide a set of velocities in an end-effector task-space and satisfying a visibility-aware planning task to provide a velocity in a camera task-space.

In Example 10, the subject matter of Example 9 includes, wherein to satisfy the visibility-aware planning task, the operations include determining a plurality of velocities, including the velocity, that are independent of a trajectory of the end effector.

In Example 11, the subject matter of Examples 9-10 includes, wherein when at least one of the tasks cannot be satisfied, the operations include determining the set of paths according to an optimization that satisfies the visual-servoing task while minimizing a deviation from the velocity in the camera task-space.

Example 12 is a system comprising: processing circuitry; and memory including instructions, which when executed by the processing circuitry, cause the processing circuitry to: generate a set of paths of an end effector of a robotic arm; determine a ranking of the set of paths using an objective function that results in a decrease in a distance between the end effector and a target while maintaining a collision mitigation path for the end effector and minimizing occlusion of a camera affixed to the end effector; convert a path of the set of paths into a trajectory based on the ranking; and output the trajectory for to cause control of the robotic arm to move the end effector.

In Example 13, the subject matter of Example 12 includes, wherein the instructions further cause the processing circuitry to: capture a first image using a second camera affixed to a joint of the robotic arm; identify an occlusion in the first image; and receive a second image from the second camera affixed to the joint of the robotic arm.

In Example 14, the subject matter of Example 13 includes, wherein to output the trajectory, the instructions further cause the processing circuitry to output a control signal to control the robotic arm based on the second image.

In Example 15, the subject matter of Examples 13-14 includes, wherein the instructions further cause the processing circuitry to project the second image into a perspective corresponding to the second camera affixed to the end effector.

In Example 16, the subject matter of Examples 12-15 includes, wherein to rank the set of paths using the objective function, the instructions further cause the processing circuitry to use optimization constraints including at least one of minimizing self-occlusion, minimizing scene occlusion, maintaining line of sight, or minimizing camera dynamics.

In Example 17, the subject matter of Example 16 includes, wherein the optimization constraints include at least one of maintaining a field of view of a second camera affixed to the end effector or a field of view of the camera affixed to the joint of the robotic arm occlusion mitigation.

In Example 18, the subject matter of Examples 12-17 includes, wherein the instructions further cause the processing circuitry to: receive a trajectory for the end effector of the robotic arm; and identify a next position for the end effector from the trajectory; and wherein to generate the set of paths of the end effector of the robotic arm, the operations include using an image captured by the camera on the joint of the robotic arm.

Example 19 is an apparatus comprising: means for generating a set of paths of an end effector of a robotic arm; means for ranking the set of paths using an objective function that results in an a decrease in a distance between the end effector and a target while maintaining a collision mitigation path for the end effector and minimizing occlusion of a camera affixed to a joint of the robotic arm; means for converting a path of the set of paths into a trajectory based on the ranking; and means for outputting the trajectory to cause control of the robotic arm to move the end effector.

In Example 20, the subject matter of Example 19 includes, wherein the means for outputting the trajectory outputs control signals for manipulating a set of motors of the robotic arm to apply a set of control commands to a set of robot links of the robotic arm that are independent of a velocity of the end effector.

Example 21 is a method comprising: generating, using processing circuitry, a set of paths of an end effector of a robotic arm; ranking the set of paths using an objective function that results in an improvement to a distance between the end effector and a target while maintaining a collision mitigation path for the end effector and minimizing occlusion of a camera affixed to a joint of the robotic arm; converting a path of the set of paths into a trajectory based on the ranking; and outputting the trajectory for controlling the robotic arm to move the end effector.

In Example 22, the subject matter of Example 21 includes, capturing a first image using a second camera affixed to the end effector; identifying an occlusion in the first image; and receiving a second image from camera affixed to the joint of the robotic arm.

In Example 23, the subject matter of Example 22 includes, wherein outputting the trajectory includes outputting a control signal to control the robotic arm based on the second image.

In Example 24, the subject matter of Examples 22-23 includes, projecting the second image into a perspective corresponding to the second camera affixed to the end effector.

In Example 25, the subject matter of Examples 21-24 includes, wherein ranking the set of paths using the objective function includes using optimization constraints including at least one of minimizing self-occlusion, minimizing scene occlusion, maintaining line of sight, or minimizing camera dynamics.

In Example 26, the subject matter of Example 25 includes, wherein the optimization constraints include at least one of maintaining the second camera affixed to the end effector or the camera affixed to the joint of the robotic arm occlusion mitigation.

In Example 27, the subject matter of Examples 21-26 includes, receiving a trajectory for the end effector of the robotic arm; and identifying a next position for the end effector from the trajectory; and wherein generating, using processing circuitry, the set of paths of the end effector of the robotic arm includes using an image captured by the camera on the joint of the robotic arm.

In Example 28, the subject matter of Examples 21-27 includes, wherein outputting the trajectory includes outputting control signals for manipulating a set of motors of the robotic arm to apply at least one velocity to a link of the robotic arm that is independent of a velocity of the end effector.

In Example 29, the subject matter of Examples 21-28 includes, wherein generating the set of paths includes attempting to satisfy a visual-servoing task to provide a set of velocities in an end-effector task-space and satisfying a visibility-aware planning task to provide a velocity in a camera task-space.

In Example 30, the subject matter of Example 29 includes, wherein satisfying the visibility-aware planning task includes determining a plurality of velocities, including the velocity, being independent of a trajectory of the end effector.

In Example 31, the subject matter of Examples 29-30 includes, wherein when at least one of the tasks cannot be satisfied, determining the set of paths according to an optimization that satisfies the visual-servoing task while minimizing a deviation from the velocity in the camera task-space.

Example 32 is at least one machine-readable medium including instructions that, when executed by processing circuitry, cause the processing circuitry to perform operations to implement of any of Examples 1-31.

Example 33 is an apparatus comprising means to implement of any of Examples 1-31.

Example 34 is a system to implement of any of Examples 1-31.

Example 35 is a method to implement of any of Examples 1-31.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/ throughput and to support edge services selections that can be made available to the edge systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure.

This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. At least one non-transitory machine-readable medium, including instructions, which when executed by processing circuitry, cause the processing circuitry to perform operations to:

generate a set of paths of an end effector of a robotic arm by attempting to satisfy a visual-servoing task to provide a set of velocities in an end-effector task-space and satisfying a visibility-aware planning task to provide a velocity in a camera task-space, respective paths of the set of paths each including at least one respective trajectory to traverse the respective paths from a first position to a respective end position;

determine a ranking of the set of paths using an objective function that results in a decrease in a distance between the end effector and a target while maintaining a collision mitigation path for the end effector and minimizing occlusion of a camera affixed to a joint of the robotic arm;

convert a path of the set of paths into a trajectory based on the ranking, the trajectory being one of the at least one respective trajectory; and output the trajectory to cause control of the robotic arm to move the end effector.

2. The at least one machine-readable medium of claim 1, wherein the operations further cause the processing circuitry to:

capture a first image using a second camera affixed to the end effector; and identify an occlusion in the first image.

3. The at least one machine-readable medium of claim 2, wherein to output the trajectory, the operations include outputting a control signal to control the robotic arm based on a second image received from the camera affixed to the joint of the robotic arm.

4. The at least one machine-readable medium of claim 2, further comprising operations to project a second image received from the camera affixed to the joint of the robotic arm into a perspective corresponding to the second camera affixed to the end effector.

5. The at least one machine-readable medium of claim 1, wherein to rank the set of paths using the objective function, the operations include using optimization constraints including at least one of minimizing self-occlusion, minimizing scene occlusion, maintaining line of sight, or minimizing camera dynamics.

6. The at least one machine-readable medium of claim 5, wherein the optimization constraints include at least one of maintaining a field of view of a second camera affixed to the end effector or a field of view of the camera affixed to the joint of the robotic arm occlusion mitigation.

7. The at least one machine-readable medium of claim 1, wherein the operations further cause the processing circuitry to:

receive a trajectory for the end effector of the robotic arm; and identify a next position for the end effector from the trajectory; and wherein to generate the set of paths of the end effector of the robotic arm, the operations include using an image captured by the camera on the joint of the robotic arm.

8. The at least one machine-readable medium of claim 1, wherein to output the trajectory, the operations include outputting control signals for manipulating a set of motors of the robotic arm to apply at least one velocity to a link of the robotic arm that is independent of a velocity of the end effector.

9. The at least one machine-readable medium of claim 1, wherein to satisfy the visibility-aware planning task, the operations include determining a plurality of velocities, including the velocity, that are independent of a trajectory of the end effector.

10. The at least one machine-readable medium of claim 1, wherein when at least one of the tasks cannot be satisfied, the operations include determining the set of paths according to an optimization that satisfies the visual-servoing task while minimizing a deviation from the velocity in the camera task-space.

11. A system comprising:

processing circuitry; and memory including instructions, which when executed by the processing circuitry, cause the processing circuitry to:

generate a set of paths of an end effector of a robotic arm by attempting to satisfy a visual-servoing task to provide a set of velocities in an end-effector task-space and satisfying a visibility-aware planning task to provide a velocity in a camera task-space, respective paths of the set of paths each including at least one respective trajectory to traverse the respective paths from a first position to a respective end position;

determine a ranking of the set of paths using an objective function that results in a decrease in a distance between the end effector and a target while maintaining a collision mitigation path for the end effector and minimizing occlusion of a camera affixed to the end effector;

convert a path of the set of paths into a trajectory based on the ranking, the trajectory being one of the at least one respective trajectory; and output the trajectory for to cause control of the robotic arm to move the end effector.

12. The system of claim 11, wherein the instructions further cause the processing circuitry to:

capture a first image using a second camera affixed to a joint of the robotic arm;

identify an occlusion in the first image; and receive a second image from the second camera affixed to the joint of the robotic arm.

13. The system of claim 12, wherein to output the trajectory, the instructions further cause the processing circuitry to output a control signal to control the robotic arm based on the second image.

14. The system of claim 12, wherein the instructions further cause the processing circuitry to project the second image into a perspective corresponding to the second camera affixed to the end effector.

15. The system of claim 11, wherein to rank the set of paths using the objective function, the instructions further cause the processing circuitry to use optimization constraints including at least one of minimizing self-occlusion, minimizing scene occlusion, maintaining line of sight, or minimizing camera dynamics.

16. The system of claim 15, wherein the optimization constraints include at least one of maintaining a field of view of a second camera affixed to the end effector or a field of view of the camera affixed to the joint of the robotic arm occlusion mitigation.

17. The system of claim 11, wherein the instructions further cause the processing circuitry to:

receive a trajectory for the end effector of the robotic arm; and identify a next position for the end effector from the trajectory; and wherein to generate the set of paths of the end effector of the robotic arm, the operations include using an image captured by the camera on the joint of the robotic arm.

18. An apparatus comprising:

means for generating a set of paths of an end effector of a robotic arm by attempting to satisfy a visual-servoing task to provide a set of velocities in an end-effector task-space and satisfying a visibility-aware planning task to provide a velocity in a camera task-space, respective paths of the set of paths each including at least one respective trajectory to traverse the respective paths from a first position to a respective end position;

means for ranking the set of paths using an objective function that results in an a decrease in a distance between the end effector and a target while maintaining a collision mitigation path for the end effector and minimizing occlusion of a camera affixed to a joint of the robotic arm;

means for converting a path of the set of paths into a trajectory based on the ranking, the trajectory being one of the at least one respective trajectory; and means for outputting the trajectory to cause control of the robotic arm to move the end effector.

19. The apparatus of claim 18, wherein the means for outputting the trajectory outputs control signals for manipulating a set of motors of the robotic arm to apply a set of control commands to a set of robot links of the robotic arm that are independent of a velocity of the end effector.

*   *   *   *   *